United States Patent
Shapiro

(10) Patent No.: US 10,132,186 B2
(45) Date of Patent: Nov. 20, 2018

(54) SYSTEM AND METHOD FOR SUPPORTING A TURBINE SHROUD

(71) Applicant: General Electric Company, Schenectady, NY (US)

(72) Inventor: Jason David Shapiro, Metheun, MA (US)

(73) Assignee: General Electric Company, schenectady, NY (US)

( * ) Notice: Subject to any disclaimer, the term of this patent is extended or adjusted under 35 U.S.C. 154(b) by 379 days.

(21) Appl. No.: 14/825,201

(22) Filed: Aug. 13, 2015

(65) Prior Publication Data

US 2017/0044922 A1 Feb. 16, 2017

(51) Int. Cl.
*F01D 11/16* (2006.01)
*F01D 11/22* (2006.01)
(Continued)

(52) U.S. Cl.
CPC .............. *F01D 11/16* (2013.01); *F01D 5/12* (2013.01); *F01D 9/041* (2013.01); *F01D 11/22* (2013.01);
(Continued)

(58) Field of Classification Search
CPC . F01D 11/16; F01D 5/12; F01D 9/041; F01D 11/22; F01D 11/025; F01D 11/003;
(Continued)

(56) References Cited

U.S. PATENT DOCUMENTS

| 3,857,649 A | 12/1974 | Schaller et al. |
| 3,992,127 A | 11/1976 | Booher, Jr. et al. |

(Continued)

FOREIGN PATENT DOCUMENTS

| CA | 2520792 A1 | 3/2006 |
| CN | 1837581 A | 9/2006 |

(Continued)

OTHER PUBLICATIONS

European Search Report and Opinion issued in connection with corresponding EP Application No. 16183985.7 dated Dec. 16, 2016.

(Continued)

*Primary Examiner* — Aaron R Eastman
(74) *Attorney, Agent, or Firm* — General Electric Company; William Andes

(57) ABSTRACT

In one aspect the present subject matter is directed to a system for supporting a turbine shroud. The system includes a shroud support at least partially defining a first piston sleeve and a piston assembly having a first piston head disposed within the first piston sleeve and a second piston head coupled to the first piston head. The first piston head is slideably engaged with an inner surface of the first piston sleeve. The second piston head is slideably engaged with an inner surface of a second piston sleeve. The system also includes a turbine shroud that is fixedly connected to the piston assembly and that extends radially inwardly from the shroud support. The piston assembly provides for radially inward and radially outward movement of the turbine shroud in response to a change in a radial force applied to a hot side surface of the turbine shroud.

16 Claims, 6 Drawing Sheets

(51) Int. Cl.
*F01D 5/12* (2006.01)
*F01D 9/04* (2006.01)

(52) U.S. Cl.
CPC ...... *F05D 2220/32* (2013.01); *F05D 2240/11* (2013.01); *F05D 2260/50* (2013.01); *F05D 2300/6033* (2013.01); *Y02T 50/672* (2013.01)

(58) Field of Classification Search
CPC .......... F01D 11/08; F01D 11/14; F01D 11/20; F05D 2220/32; F05D 2240/11; F05D 2260/50; F05D 2300/6033
See application file for complete search history.

(56) References Cited

U.S. PATENT DOCUMENTS

| | | | |
|---|---|---|---|
| 4,053,257 A * | 10/1977 | Rahaim | F01D 5/284 |
| | | | 415/200 |
| 4,844,688 A * | 7/1989 | Clough | F01D 11/22 |
| | | | 415/113 |
| 5,636,659 A | 6/1997 | Smed | |
| 6,726,448 B2 | 4/2004 | Farrell et al. | |
| 7,117,983 B2 * | 10/2006 | Good | F01D 9/04 |
| | | | 188/380 |
| 7,238,002 B2 | 7/2007 | Cairo et al. | |
| 7,794,200 B2 | 9/2010 | Mukherjee | |
| 8,182,207 B2 | 5/2012 | Ballard, Jr. et al. | |
| 2004/0126222 A1 * | 7/2004 | Addis | F01D 11/00 |
| | | | 415/1 |
| 2006/0067815 A1 | 3/2006 | Ghasripoor | |
| 2007/0098546 A1 * | 5/2007 | Cairo | F01D 11/005 |
| | | | 415/170.1 |
| 2008/0267770 A1 * | 10/2008 | Webster | F01D 11/005 |
| | | | 415/173.1 |
| 2010/0313404 A1 * | 12/2010 | Bates | F01D 11/22 |
| | | | 29/402.01 |
| 2012/0107122 A1 | 5/2012 | Albers et al. | |
| 2013/0022442 A1 | 1/2013 | Duguay | |
| 2014/0202168 A1 | 7/2014 | Shapiro et al. | |
| 2016/0017743 A1 | 1/2016 | Nanukuttan et al. | |
| 2016/0053626 A1 * | 2/2016 | Blaney | F01D 11/20 |
| | | | 415/1 |

FOREIGN PATENT DOCUMENTS

| | | |
|---|---|---|
| EP | 2549065 A1 | 1/2013 |
| JP | 63182368 U | 11/1988 |
| JP | 04187801 A | 7/1992 |
| WO | 2014186015 A2 | 11/2014 |
| WO | 2014200575 A2 | 12/2014 |

OTHER PUBLICATIONS

Notification of Reasons for Refusal issued in connection with corresponding JP Application No. 2016-151635 dated Jun. 6, 2017.
First Office Action and Search issued in connection with corresponding CN Application No. 201610659546.7 dated Jun. 20, 2017.

* cited by examiner

SYSTEM AND METHOD FOR SUPPORTING A TURBINE SHROUD

FIELD OF THE INVENTION

The present subject matter relates generally to a gas turbine engine. More particularly, the present subject matter relates to a system and method for supporting a turbine shroud of the gas turbine engine.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as rows of turbine rotor blades and rotor disks, and various stationary turbine components such as rows of stator vanes or nozzles and turbine shrouds. The rotatable and the stationary turbine components at least partially define the hot gas path through the turbine section.

Each turbine shroud forms a ring around or circumscribes a corresponding row of the turbine rotor blades. Radial gaps are defined between blade tips of the row of turbine rotor blades and a hot side surface of each of the turbine shrouds. The gaps are generally sized to avoid rubbing of the blade tips against the hot side surface while reducing or preventing leakage of the combustion gases flowing through the hot gas path through the gap, thereby improving overall efficiency of the gas turbine engine.

Rubbing of the blade tips against the turbine shrouds may be caused by various factors. For example, rubbing may be caused by pressure pulses of the combustion gases flowing through the hot gas path and/or by thermal transients within the turbine section during startup or transitions between operating modes of the gas turbine engine. Blade strikes may potentially affect the mechanical life of the turbine rotor blades and/or potentially result in undesirable leakage of the combustion gases through the radial gaps.

Conventionally, the turbine shrouds are rigidly mounted to a static structure or portion of the turbine of gas turbine engine and are radially fixed in position during operation. As a result, the turbine shrouds do not move radially when the turbine rotor blades strike or rub the hot side surface, thus potentially resulting in bending of the turbine rotor blades and/or damage to turbine shrouds. Accordingly, a system for mounting or supporting the turbine shrouds which allows for radial movement of the turbine shroud during a blade rub or strike event, thus preventing or reducing damage to at least one of the turbine rotor blades and/or the turbine shroud, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for supporting a turbine shroud. The system includes a shroud support at least partially defining a first piston sleeve and a piston assembly having a first piston head disposed within the first piston sleeve and a second piston head coupled to the first piston head. The first piston head is slideably engaged with an inner surface of the first piston sleeve. The second piston head is slideably engaged with an inner surface of a second piston sleeve. The system also includes a turbine shroud that is fixedly connected to the piston assembly and that extends radially inwardly from the shroud support. The piston assembly provides for radially inward and radially outward movement of the turbine shroud in response to a change in a radial force applied to a hot side surface of the turbine shroud.

Another aspect of the present subject matter is directed to a system for supporting a turbine shroud. The system includes a shroud support and a piston assembly. The piston assembly includes a first piston head that is fixedly connected to an inner surface of the shroud support and a second piston head that is coupled to the first piston head. The second piston head is slideably engaged with an inner surface of a piston sleeve that extends through an outer casing. The system further includes a turbine shroud that is fixedly connected to the piston assembly and that extends radially inwardly from the shroud support. The piston assembly provides for movement of the turbine shroud in response to a change in a radial force applied to a hot side surface of the turbine shroud.

One embodiment of the present disclosure provides a method for supporting a turbine shroud that is fixedly connected to a piston assembly where the piston assembly includes a first piston head that is connected to the turbine shroud and that is disposed within a first pressure chamber and a second piston head that is linked to the first piston head and disposed between the pressure chamber and a second pressure chamber and where a hot side of the turbine shroud is directed towards a hot gas path of a turbine. The method includes pressurizing the first pressure chamber with a first pressurized medium so as to provide a first radial force against a backside of the first piston head and pressurizing the second pressure chamber with a second pressurized medium so as to provide a second radial force against the second piston head. The turbine shroud is held in a first position by the piston assembly when a sum of the first radial force and the second radial force is substantially equal to a radially outward force applied to the hot side surface of the turbine shroud. The turbine shroud moves to second position when the sum of first radial force and the second radial force is less than the radially outward force applied to the hot side surface of the turbine shroud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
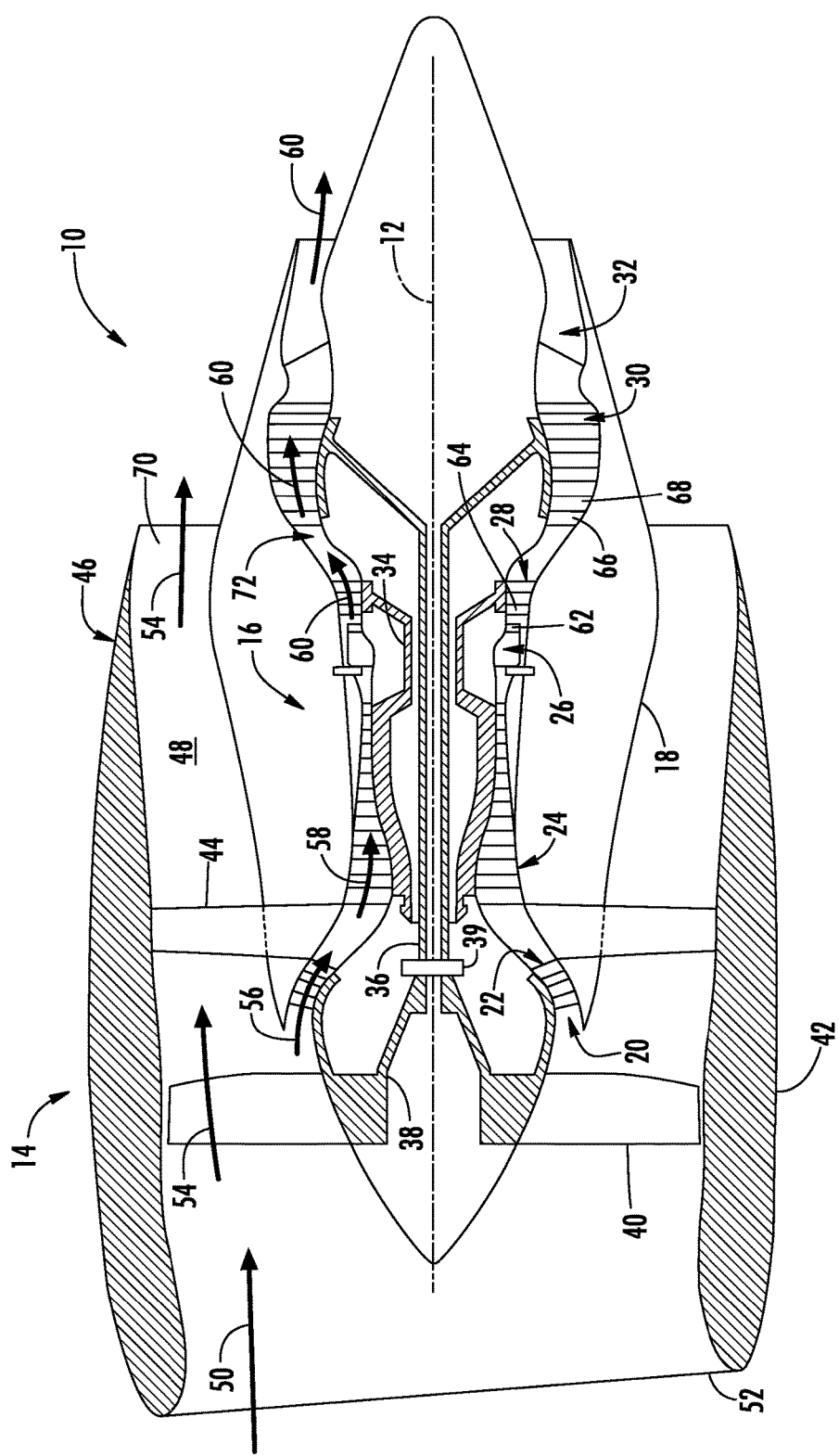
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary high-bypass turbofan jet engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a fan section 14 and a core turbine engine or gas turbine engine 16 disposed downstream from the fan section 14.

The core turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) shaft or spool 36 may also be connected to a fan spool or shaft 38 of the fan section 14. In particular embodiments, as shown in FIG. 1, the (LP) shaft or spool 36 may be connected directly to the fan spool 38 such as in a direct-drive configuration. In alternative embodiments, the (LP) shaft or spool 36 may be connected to the fan spool 38 via a reduction gear 39 such as in an indirect-drive or geared-drive configuration.

As shown in FIG. 1, the fan section 14 includes a plurality of fan blades 40 that are coupled to and that extend radially outwardly from the fan spool 38. An annular fan casing or nacelle 42 circumferentially surrounds the fan section 14 and/or at least a portion of the core turbine engine 16. It should be appreciated by those of ordinary skill in the art that the nacelle 42 may be configured to be supported relative to the core turbine engine 16 by a plurality of circumferentially-spaced outlet guide vanes 44. Moreover, a downstream section 46 of the nacelle 42 may extend over an outer portion of the core turbine engine 16 so as to define a bypass airflow passage 48 therebetween.

During operation of the turbofan 10, a volume of air 50 enters the turbofan 10 through an associated inlet 52 of the nacelle 42 and/or fan section 14. As the volume of air 50 passes across the fan blades 40 a first portion of the air 50 as indicated by arrows 54 is directed or routed into the bypass airflow passage 48 and a second portion of the air 50 as indicated by arrow 56 is directed or routed into the LP compressor 22. The ratio between the first portion of air 54 and the second portion of air 56 is commonly known as bypass ratio. The pressure of the second portion of air 56 is then increased as it is routed towards the high pressure (HP) compressor 24 (as indicated by arrow 58). The second portion of air 58 is routed from the HP compressor 24 into the combustion section 26 where it is mixed with fuel and burned to provide combustion gases 60.

The combustion gases 60 are routed through the HP turbine 28 where a portion of thermal and/or kinetic energy from the combustion gases 60 is extracted via sequential stages of HP turbine stator vanes 62 that are coupled to the outer casing 18 and HP turbine rotor blades 64 that are coupled to the HP shaft or spool 34, thus causing the HP shaft or spool 34 to rotate, thereby supporting operation of the HP compressor 24. The combustion gases 60 are then routed through the LP turbine 30 where a second portion of thermal and kinetic energy is extracted from the combustion gases 60 via sequential stages of LP turbine stator vanes 66 that are coupled to the outer casing 18 and LP turbine rotor blades 68 that are coupled to the LP shaft or spool 36, thus causing the LP shaft or spool 36 to rotate, thereby supporting operation of the LP compressor 22 and/or rotation of the fan spool or shaft 38.

The combustion gases 60 are then routed through the jet exhaust nozzle section 32 of the core turbine engine 16 to provide propulsive thrust. Simultaneously, the pressure of the first portion of air 54 is substantially increased as the first portion of air 54 is routed through the bypass airflow passage 48 before it is exhausted from a fan nozzle exhaust section 70 of the turbofan 10 providing propulsive thrust. The HP turbine 28, the LP turbine 30 and the jet exhaust nozzle section 32 at least partially define a hot gas path 72 for routing the combustion gases 60 through the core turbine engine 16.

Along with a turbofan engine, a core turbine 16 serves a similar purpose and sees a similar environment in a land based gas turbine, a turbojet engine, where the ratio of the first portion of air 54 to the second portion of air 56 is less than that of a turbo fan, and in an unducted fan engine, where the fan section 14 is devoid of a nacelle 42. In each of the turbofan, turbojet, and unducted engines, a speed reduction device, for example, reduction gearbox 39, may be included between any shafts and spools, for example, between the (LP) shaft or spool 36 and the fan spool or shaft 38 of the fan section 14.

Figure 2:
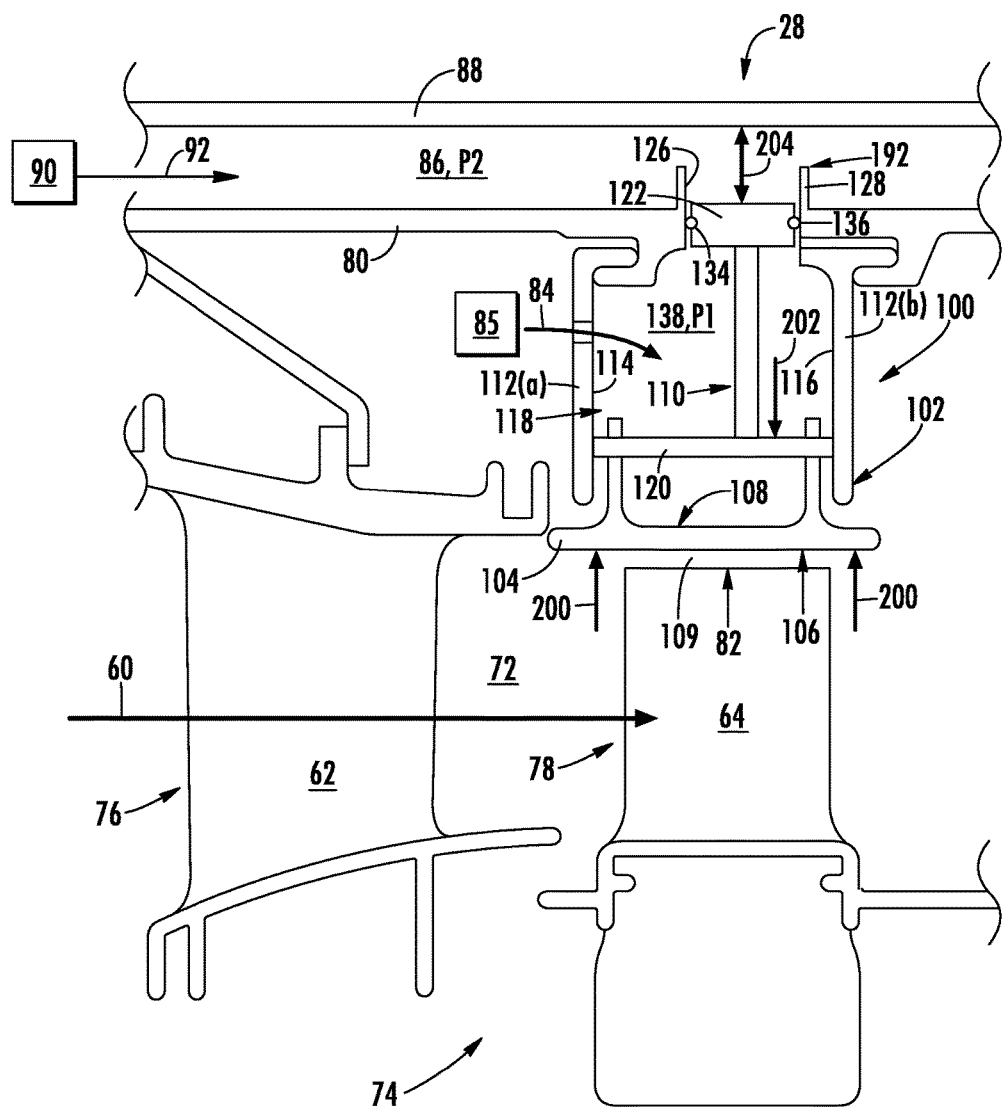
FIG. 2 is an enlarged cross sectional side view of a high pressure (HP) turbine portion of the gas turbine engine as shown in FIG. 1, according to one embodiment of the present invention.

FIG. 2 provides a cross sectional side view of an exemplary stage 74 of the HP turbine 28 including a row 76 of the stationary vanes 62 (only one vane shown) and a row 78 of the turbine rotor blades 64 (only one rotor blade shown) according to various embodiments of the present invention. It is intended that the stage 74 of the HP turbine 28 as shown in FIG. 2 may be representative of any stage of stator vanes or turbine rotor blades of the HP turbine 28 or the LP turbine 30, and FIG. 2 is not intended to limit the invention as described or claimed herein to any particular stage of stator vanes or turbine rotor blades of the core turbine engine 16 unless otherwise provided in the claims.

As shown in FIG. 2, one or more static structures such as a backbone or casing 80 may surround the rows 76, 78 of the stationary vanes 62 and the turbine rotor blades 64. In various embodiments, a turbine shroud assembly 100 forms a ring around the row 78 of turbine rotor blades 64. The turbine shroud assembly 100 generally includes a shroud support or hanger portion 102 and a turbine shroud 104. In particular embodiments, the turbine shroud assembly 100 may be coupled or connected to the casing 80 or other static support structure via the shroud support 102.

In particular embodiments, the turbine shroud 104 may be formed as a continuous, unitary or seamless ring made of a ceramic material or a ceramic matrix composite (CMC) material. In other embodiments, the turbine shroud 104 may be formed from other materials such as metallic materials. In particular embodiments, the turbine shroud 104 may be formed from a plurality of turbine shroud blocks or segments annularly arranged around the row 78 of turbine blades 64.

In particular embodiments, as shown in FIG. 2, the turbine shroud 104 includes a hot side portion or surface 106 and a back side portion or surface 108 that is radially spaced from the hot side surface 106. A radial clearance gap 109 is defined between the hot side surface 106 and a blade tip portion 82 of the turbine rotor blade 64. It is generally desirable to minimize the radial clearance gap 109 as much as possible, particularly during cruise operation of the turbofan 10, to reduce leakage from the hot gas path 72 through the radial clearance gap 109. However, the radial clearance gap 109 must also account for pressure pulses, thermal transients or other occurrences which may cause the turbine rotor blades 64 to shift radially outwardly towards and/or into the turbine shroud 104, thus potentially resulting in a blade rub or strike event between the turbine rotor blades 64 and the hot side surface 106 of the turbine shroud 104.

In various embodiments, as shown in FIG. 2, the turbine shroud assembly 100 includes a damper or piston assembly 110. The piston assembly 110 provides for substantially radially inward and/or substantially radially outward movement of the turbine shroud 104 based upon a radially outward force 200 or change in the radially outward force 200 that is exerted on the hot side surface 106 during fired operation of the gas turbine engine 16. The radially outward force 200 is generally provided by the combustion gases 60 flowing through the hot gas path 72 of the HP turbine 28 and/or the LP turbine 30 of the gas turbine engine 16. However, at times the radially outward force 200 may be provided by the blade tip portion 82 of the turbine rotor blades 64 such as in the case of a blade strike or rub event.

Figure 3:
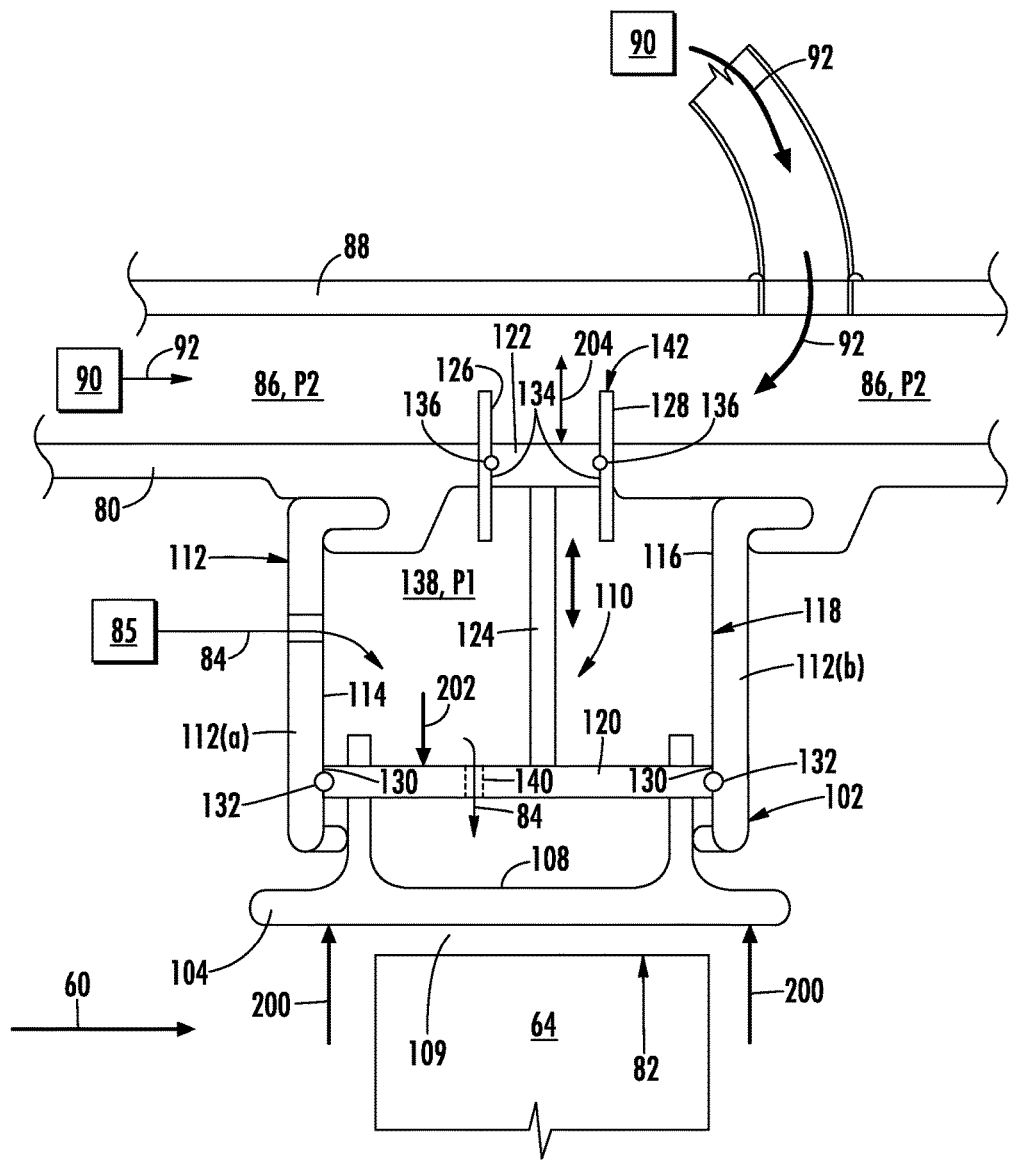
FIG. 3 is an enlarged view of the turbine shroud assembly including a piston assembly according to various embodiments of the present invention.
Figure 4:
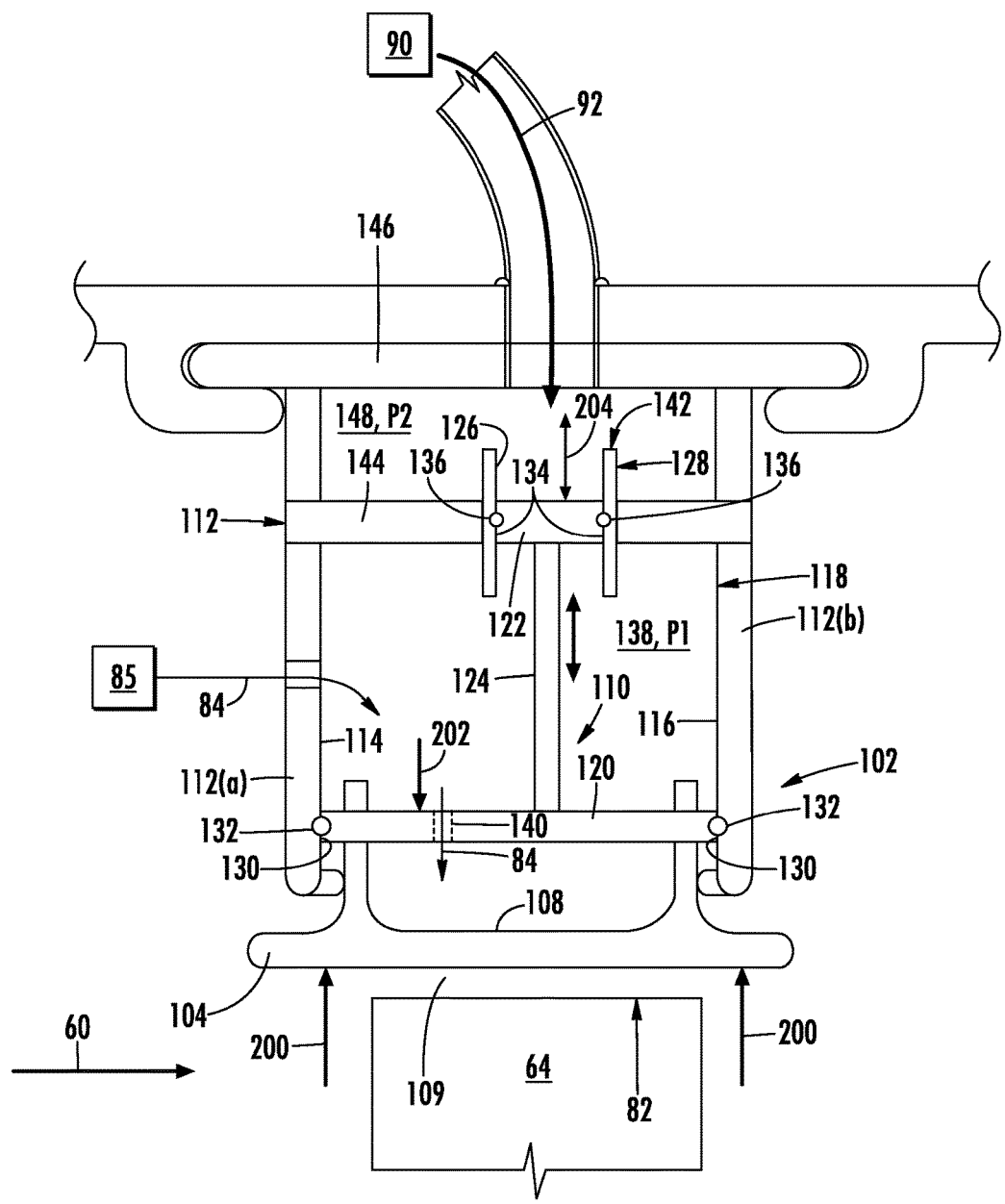
FIG. 4 is an enlarged view of the turbine shroud assembly including a piston assembly according to various embodiments of the present invention.

FIGS. 3 and 4 provide enlarged views of the turbine shroud assembly 100 including the piston assembly 110 according to various embodiments of the present invention. In particular embodiments, as shown collectively in FIGS. 2, 3 and 4, the shroud support 102 includes one or more outer walls 112. For example, in particular embodiments, the shroud support 102 includes a forward wall 112(a) that is axially spaced from an aft wall 112(b). At least a portion of the forward wall 112(a) extends substantially parallel to at least a portion of the aft wall 112(b). In various embodiments, an inner surface 114 of the forward wall 112(a) and an inner surface 116 of the aft wall 112(b) may at least partially define a first piston sleeve 118 within the shroud support 102. The first piston sleeve 118 may extend substantially radially within the shroud support 102.

In various embodiments, as shown in FIGS. 2, 3 and 4, the piston assembly 110 includes a first piston head 120 that is disposed within the first piston sleeve 118 and a second piston head 122 that is coupled to the first piston head 120 via a shaft or mechanical linkage(s) 124. In particular embodiments, as shown in FIGS. 3 and 4, the first piston head 120 is slideably engaged with the inner surfaces 114, 116 of the forward and aft walls 112(a) and 112(b). In other embodiments, as shown in FIG. 2, the first piston head 120 is fixed to the inner surfaces 114, 116 of the forward and aft walls 112(a) and 112(b).

In various embodiments, as shown in FIGS. 2, 3 and 4, the second piston head 122 is slideably engaged with an inner surface 126 of a second piston sleeve 128. In particular embodiments, as shown in FIGS. 3 and 4, a seal is formed between the inner surfaces 114, 116 of the forward and aft walls 112(a) and 112(b) and side surfaces 130 of the first piston head 120. The seal may be at least partially formed via one or more piston or ring seals 132. As shown in FIGS. 2, 3 and 4, a seal is formed between the inner surface 126 of the second piston sleeve 128 and side surfaces 134 of the second piston head 122. The seal may be at least partially formed via one or more piston or ring seals 136.

In various embodiments, the turbine shroud 104 may be fixedly connected to the piston assembly 110. As shown in FIGS. 2, 3 and 4, the turbine shroud 104 extends radially inwardly from the shroud support 102 and/or the piston assembly 110 towards the turbine rotor blade 64. In particular embodiments, the turbine shroud 104 may be connected or coupled to the first piston head 120. The turbine shroud 104 may be connected or coupled to the piston assembly 110 and/or the first piston head 120 by any suitable means such as by welding, pins, linkages and/or other mechanical fasteners.

In various embodiments, as shown in FIGS. 2, 3 and 4, the shroud support 102 at least partially defines a first pressure chamber 138 within the turbine shroud assembly 100. For example, the first pressure chamber 138 may be at least partially defined between at least a portion of the forward wall 112(a) and at least a portion of the aft wall 112(b). In particular embodiments, the first pressure chamber 138 is at least partially defined within the shroud support 102 between the first piston head 120 and the second piston head 122. In particular embodiments, as shown in FIGS. 3 and 4, the first piston head 120 includes at least one aperture 140. The aperture 140 may provide for fluid flow from the first pressure chamber 138, through the first piston head 120 and towards the back side surface 108 of the turbine shroud 104, thereby potentially providing at least one of convection, conduction and/or impingement cooling of the back side surface 108.

The first pressure chamber 138 may be formed or configured to receive a flow of a pressurized medium 84 such as compressed air from a cooling medium source 85 such as the LP compressor 22 or the HP compressor 24 (FIG. 1). The pressurized medium 84 pressurizes the first pressure chamber 138 to a first pressure P1, thus applying a first radially inward force 202 against the first piston head 120. The first radially inward force 202 may be sufficient to push down and/or hold the turbine shroud 104 at a desired radial distance from the blade tip portion 82 of the turbine rotor blade 64, thereby maintaining a desired radial clearance gap 109 therebetween. The first pressure P1 may be dependent on an operation mode or condition of the gas turbine engine 16. For example, a higher engine RPM may result in a higher first pressure P1, while a lower RPM of the engine may result in a lower first pressure P1.

In particular embodiments, as shown in FIGS. 2 and 3, the second piston sleeve 128 extends radially or substantially radially through the casing 80 and into a second pressure chamber or plenum 86. In one embodiment, the second pressure chamber 86 may be defined between the casing 80 and an outer casing 88. The second pressure chamber 86 is in fluid communication with a pressurized medium supply 90 that supplies a pressurized gas, liquid, steam or other medium as indicated by arrows 92 to the second pressure chamber 86.

In particular embodiments, the pressurized medium supply 90 may include at least one of the LP compressor 22 and the HP compressor 24. In particular embodiments, as shown in FIGS. 3 and 4, the pressurized medium supply 90 may be external from the outer casing 88 and/or the gas turbine engine 16. As shown in FIGS. 2, 3 and 4, the pressurized medium supply 90 pressurizes the second pressure chamber 86 with the pressurized medium 92 to a second pressure P2. Pressure P2 may be greater than, less than or equal to pressure P1 within the first pressure chamber 138.

In various embodiments, one end 142 of the second piston sleeve 128 is open. In particular embodiments, the open end 142 is in fluid communication with the second pressure chamber 86 and/or the pressurized medium supply 90. As a result, the pressurized medium 92 may exert a second radial force 204 against the second piston head 122. Radial force 204 may be a radially inward force. Pressure P2 may also be dependent on and/or adjusted according to an operation mode or condition of the gas turbine engine 16 and/or pressure P1.

In particular embodiments, as shown in FIG. 4, the second piston sleeve 128 extends radially or substantially radially through an intermediate wall or baffle 144 of the shroud support 102. The intermediate wall 144 may extend at least partially between the front wall 112(a) and the aft wall 112(b). In one embodiment, the intermediate wall 144 and a radially outer wall portion 146 of the shroud support 102 may at least partially define pressure chamber 148 therebetween.

As shown in FIG. 4, pressure chamber 148 is in fluid communication with the pressurized medium supply 90 so as to provide the pressurized medium 92 to the second pressure chamber 86. The pressurized medium supply 90 pressurizes the pressure chamber 148 with the pressurized medium 92 to pressure P2. Pressure P2 in pressure chamber 148 may be greater than, less than or equal to pressure P1. In particular embodiments, a radial pressure delta across the second piston head 122 (from the first pressure chamber 138 to the second pressure chamber 86, 148) is less than a radial pressure gradient across the turbine shroud 104 (from the hot gas path 72 to the first plenum 138).

In various embodiments, the one end 142 of the second piston sleeve 128 is in fluid communication with pressure chamber 148 and/or the pressurized medium supply 90. As a result, the pressurized medium 92 may exert radial force 204 against the second piston head 122. The second radial force 204 may be a radially downward force such as when the second pressure P2 is greater than pressure P1 in the first pressure chamber 138.

In various embodiments of the present invention, the size or shape of the second piston head 122 and the pressure P2 from the pressurized medium supply 90 may be chosen or specified so that a radial pressure delta across the second piston head 122 is the same as a radial pressure delta across the turbine shroud 104. In addition or in the alternative, the size or shape of the first piston head 120 and the pressure P1 from the cooling medium source 85 may be chosen or specified so that a radial pressure delta across the second piston head 122 is the same as a radial pressure delta across the turbine shroud 104. As a result, a sum of the radial forces 202 and 204 applied to the first piston head 120 and the second piston head 122 respectfully may be substantially equal to the radially outward force 200 applied to the turbine shroud 104 such that there is a zero or substantially zero net radial force on the turbine shroud.

Figure 5:
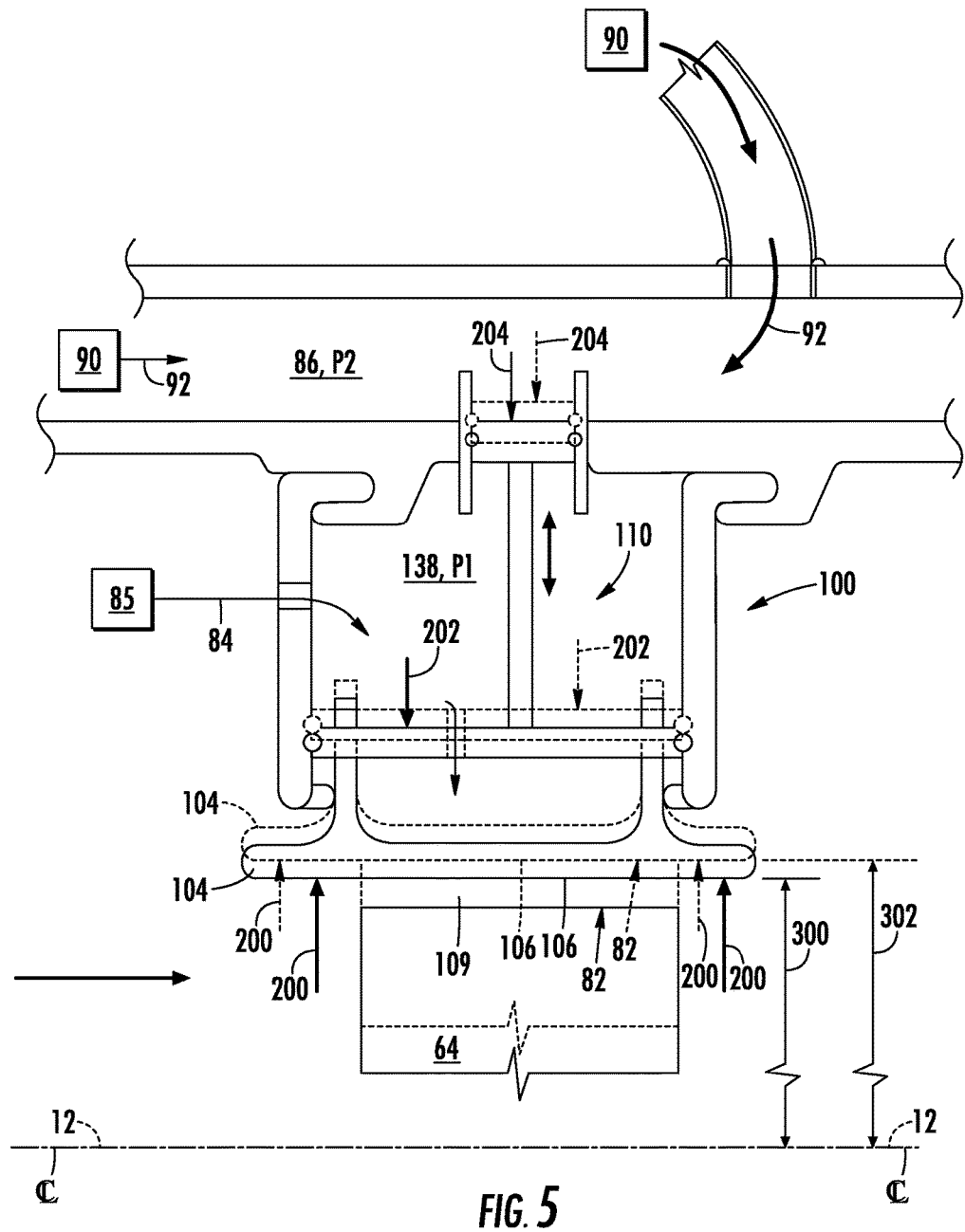
FIG. 5 is an enlarged view of the turbine shroud assembly including a piston assembly according to various embodiments of the present invention.

FIG. 5 provides an enlarged view of the turbine shroud assembly 100 including the piston assembly 110 in operation. As shown in FIG. 5 and as represented in solid lines, the piston assembly 110 may hold or support the turbine shroud 104 in a first radial position 300 with respect to center line 12 when the sum of the first radial force 202 and the second radial force 204 are substantially equal to the hot side radial force 200 exerted on the hot side surface 106 of the turbine shroud 104. The first radial position 300 may be adjusted to maintain or achieve a preferred radial clearance gap 109 between the blade tip portion 82 of the turbine rotor blade 64 and the hot side surface 106 of the turbine shroud. For example, the first pressure P1 in the first pressure chamber 138 and/or the second pressure P2 in the second pressure chamber 86 or 148 (FIG. 4) may be increased or decreased by modifying the flow of the pressure mediums 84, 92 so as to move the turbine shroud radially inwardly or radially outwardly with respect to the blade tip portion 82.

In the circumstance where the sum of the first radial force 202 and the second radial force 204 are less than the hot side radial force 200 exerted on the hot side surface 106 of the turbine shroud 104, such as during a blade strike or rub event or a combustion gas pulsation within the hot gas path, the piston assembly allows movement of the turbine shroud to a second radial position 302 as indicated in dashed lines in FIG. 5, thus reducing or preventing damage to the turbine shroud 104 and/or to the blade tip portion 82 of the turbine rotor blades 64.

Figure 6:
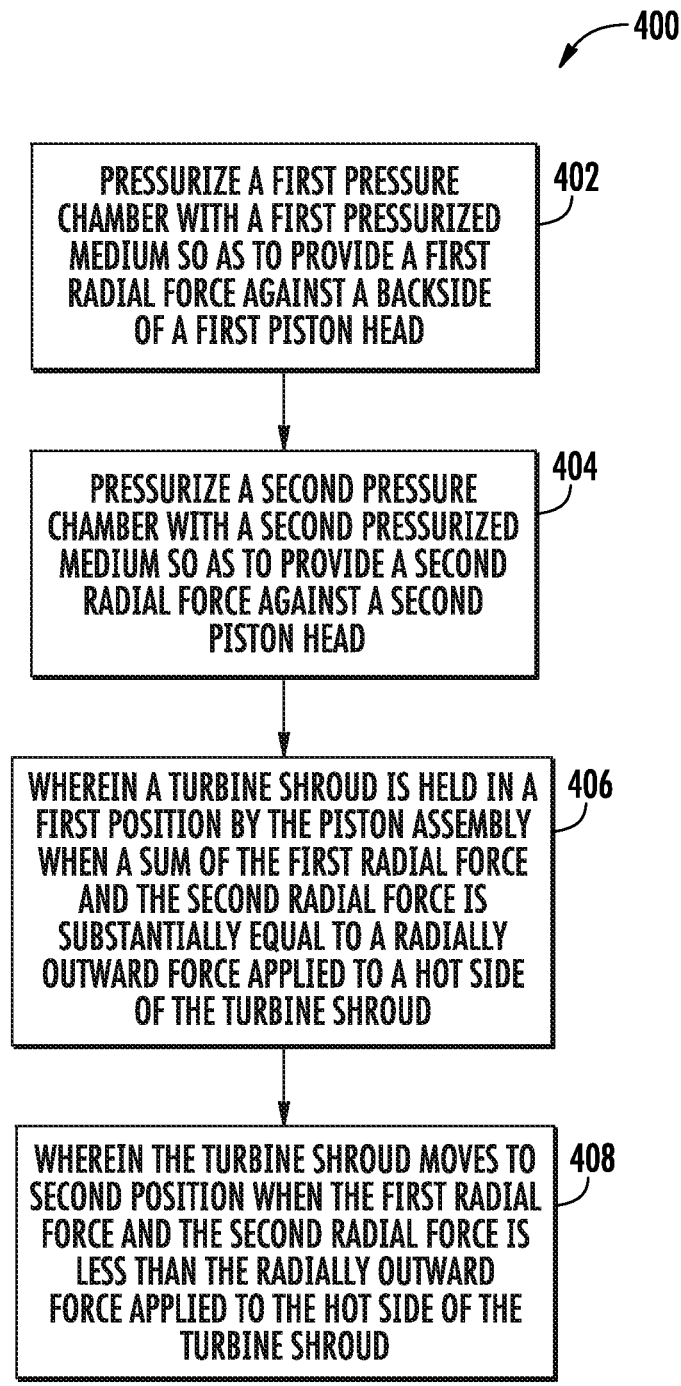
FIG. 6 is a flow diagram of a method for supporting a turbine shroud.

FIG. 6 is a method flow diagram according to various embodiments of the present invention. As show in FIG. 6, the various embodiments as illustrated in FIGS. 2, 3, 4 and 5 and as described herein provide a method 400 for supporting a turbine shroud. At step 402, the method 400 includes pressurizing the first pressure chamber with the first pressurized medium so as to provide the first radial force against the backside of the first piston head. At step 404, method 400 includes pressurizing the second pressure chamber 86, 148 with the second pressurized medium so as to provide the second radial force against the second piston head. At 406, method 400 provides that the turbine shroud is held in a first position by the piston assembly when the sum of the first radial force and the second radial force is substantially equal to the hot side radial force applied to the hot side surface of the turbine shroud. At 408, method 400 provides that the turbine shroud moves to second position when the sum of the first radial force and the second radial force is less than the hot side radial force applied to the hot side surface of the turbine shroud.

In particular embodiments, method 400 may include adjusting pressure in at least one of the first pressure chamber and the second pressure chamber to maintain equilibrium between the sum of the first radial force and the second radial force and the hot side radial force. In one embodiment, method 400 may include adjusting the pressure in at least one of the first pressure chamber and the second chamber to increase, decrease or to maintain a radial clearance gap between the turbine rotor blade tip and the hot side of the turbine shroud.

The technical purpose of driving to a zero net radial force is so that in the event of turbine blade contact, each individual turbine shroud can be pushed out of the way by the turbine rotor blades 64 instead of taking a rub or strike which may result in damage to the turbine blade tip portion 82 and/or the turbine shroud 104. In addition or in the alternative, various embodiments, of this invention may maintain a substantially constant radial tip clearance 109 and therefore enhance performance by allowing the radial clearance gap 109 to be as tight as possible while preventing turbine shroud and/or turbine rotor blade damage in the event of a rub.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supporting a turbine shroud, the system comprising:
   a shroud support, the shroud support at least partially defining a first piston sleeve therein;
   a piston assembly having a first piston head disposed within the first piston sleeve and a second piston head coupled to the first piston head, wherein the first piston head is slideably engaged with an inner surface of the first piston sleeve, wherein the second piston head is slideably engaged with an inner surface of a second piston sleeve; and
   a turbine shroud fixedly connected to the piston assembly and extending radially inwardly from the shroud support, wherein the piston assembly provides for radially inward and radially outward movement of the turbine shroud in response to a radially outward force applied to a hot side surface of the turbine shroud;
   wherein a first pressure chamber is at least partially defined within the shroud support between the first piston head and the second piston head, wherein the first pressure chamber is pressurized at a first pressure to provide a first radially inward force on a backside surface of the first piston head; and
   wherein a second end of the second piston sleeve is open and in fluid communication with a pressurized medium supply, wherein the pressurized medium supply is pressurized at a second pressure to provide a second radially inward force on the second piston head.

2. The system as in claim 1, wherein a sum of the first radial force and the second radial force is equal to the radial force applied to the hot side surface of the turbine shroud when the radially outward force is provided by combustion gases flowing across the hot side surface of the turbine shroud.

3. The system as in claim 1, wherein a sum of the first radial force and the second radial force is less than the radial force applied to the hot side surface of the turbine shroud when the radially outward force is provided by turbine rotor blade tips.

4. The system as in claim 1, wherein the second piston sleeve extends through a radially outer wall portion of the shroud support, wherein the second piston sleeve is in fluid communication with a pressurized medium supply.

5. The system as in claim 1, wherein the second piston sleeve extends radially through an outer casing that surrounds the shroud support, wherein the second piston sleeve is in fluid communication with a pressurized medium supply.

6. The system as in claim 1, wherein a radial pressure delta across the second piston head is the same as a radial pressure delta across the turbine shroud.

7. A system for supporting a turbine shroud, the system comprising:
   a shroud support, the shroud support at least partially defining a first piston sleeve therein;
   a piston assembly having a first piston head disposed within the first piston sleeve and a second piston head coupled to the first piston head, wherein the first piston head is slideably engaged with an inner surface of the first piston sleeve, wherein the second piston head is slideably engaged with an inner surface of a second piston sleeve; and
   a turbine shroud fixedly connected to the piston assembly and extending radially inwardly from the shroud support, wherein the piston assembly provides for radially inward and radially outward movement of the turbine shroud in response to a radially outward force applied to a hot side surface of the turbine shroud;
   wherein the first piston head includes at least one aperture, wherein the aperture provides for fluid flow through the first piston head towards a back side surface of the turbine shroud.

8. A system for supporting a turbine shroud, the system comprising:
   a shroud support, the shroud support at least partially defining a first piston sleeve therein;
   a piston assembly having a first piston head disposed within the first piston sleeve and a second piston head coupled to the first piston head, wherein the first piston head is slideably engaged with an inner surface of the first piston sleeve, wherein the second piston head is slideably engaged with an inner surface of a second piston sleeve; and
   a turbine shroud fixedly connected to the piston assembly and extending radially inwardly from the shroud support, wherein the piston assembly provides for radially inward and radially outward movement of the turbine shroud in response to a radially outward force applied to a hot side surface of the turbine shroud;

wherein the shroud support defines a first pressure chamber between the first piston head and an intermediate wall portion of the shroud support and a second pressure chamber defined between the intermediate wall and a radially outer wall portion of the shroud support, wherein the second piston sleeve extends radially through the intermediate wall and is open to the second pressure chamber.

9. A system for supporting a turbine shroud, the system comprising:
    a shroud support;
    a piston assembly having a first piston head fixedly connected to an inner surface of the shroud support and a second piston head coupled to the first piston head, wherein the second piston head is slideably engaged with an inner surface of a piston sleeve that extends through an outer casing; and
    a turbine shroud fixedly connected to the piston assembly and extending radially inwardly from the shroud support, wherein the piston assembly provides for movement of the turbine shroud in response to a change in a radially outward force applied to a hot side surface of the turbine shroud;
    wherein a first pressure chamber is at least partially defined within the shroud support between the first piston head and the second piston head, wherein the first pressure chamber is pressurized at a first pressure to provide a first radially inward force on a backside surface of the first piston head; and
    wherein one end of the piston sleeve is open and in fluid communication with a pressurized medium supply, wherein the pressurized medium supply is pressurized at a second pressure to provide a second radially inward force on the second piston head.

10. The system as in claim 9, wherein a radial pressure delta across the second piston head is substantially the same as a radial pressure delta across the turbine shroud.

11. The system as in claim 9, wherein a sum of the first radial force and the second radial force is equal to the radial force applied to the hot side surface of the turbine shroud when the radially outward force is provided by combustion gases flowing across the hot side surface of the turbine shroud.

12. The system as in claim 9, wherein a sum of the first radial force and the second radial force is less than the radial force applied to the hot side surface of the turbine shroud when the radially outward force is provided by turbine rotor blade tips.

13. A system for supporting a turbine shroud, the system comprising:
    a shroud support, the shroud support at least partially defining a first piston sleeve therein;
    a piston assembly having a first piston head disposed within the first piston sleeve and a second piston head coupled to the first piston head, wherein the first piston head is slideably engaged with an inner surface of the first piston sleeve, wherein the second piston head is slideably engaged with an inner surface of a second piston sleeve; and
    a turbine shroud fixedly connected to the piston assembly and extending radially inwardly from the shroud support, wherein the piston assembly provides for radially inward and radially outward movement of the turbine shroud in response to a radially outward force applied to a hot side surface of the turbine shroud;
    wherein the first piston head includes at least one aperture, wherein the aperture provides for fluid flow through the first piston head towards a back side surface of the turbine shroud.

14. A method for supporting a turbine shroud, wherein the turbine shroud is fixedly connected to a piston assembly, wherein the piston assembly includes a first piston head connected to the turbine shroud and disposed within a first pressure chamber and a second piston head linked to the first piston head and disposed between the first pressure chamber and a second pressure chamber, wherein a hot side surface of the turbine shroud is directed towards a hot gas path of a turbine, the method comprising:
    pressurizing the first pressure chamber with a first pressurized medium so as to provide a first radial force against a backside to the first piston head;
    pressurizing the second pressure chamber with a second pressurized medium so as to provide a second radial force against the second piston head;
    wherein the turbine shroud is held in a first position by the piston assembly when a sum of the first radial force and the second radial force is substantially equal to a radially outward force applied to the hot side surface of the turbine shroud; and
    wherein the turbine shroud moves to second position when the sum of first radial force and the second radial force is less than the radially outward force applied to the hot side surface of the turbine shroud.

15. The method as in claim 14, further comprising adjusting pressure in at least one of the first pressure chamber and the second pressure chamber to maintain equilibrium between the sum of the first radial force and the second radial force and the radially outward force applied to the hot side of the turbine shroud by combustion gases.

16. The method as in claim 14, further comprising adjusting the pressure in at least one of the first pressure chamber and the second chamber to increase, decrease or to maintain a radial gap between the turbine rotor blade tip and the hot side of the turbine shroud.

* * * * *